Nov. 29, 1927.  
J. GUBA  
1,651,118

ADJUSTABLE PITMAN FOR COMPRESSED AIR ENGINES

Filed Feb. 2, 1927

INVENTOR
John Guba
BY
ATTORNEY

Patented Nov. 29, 1927.

1,651,113

UNITED STATES PATENT OFFICE.

JOHN GÚBA, OF LETHBRIDGE, ALBERTA, CANADA, ASSIGNOR OF ONE-FOURTH TO ANDRAS ANDREKOVICS, OF LETHBRIDGE, CANADA.

ADJUSTABLE PITMAN FOR COMPRESSED-AIR ENGINES.

Application filed February 2, 1927. Serial No. 165,318.

This invention relates to compressed air engines, the invention having more particular reference to novel improvements hereinafter fully set forth and explained.

The invention has for an object the provision of a compressed air engine of novel construction and arrangement of parts.

For further comprehension of the invention, and of the objects and advantages thereof, reference will be had to the following description and accompanying drawings, and to the appended claim in which the various novel features of the invention are more particularly set forth.

Fig. 1 of the drawings, is a side elevational view of my compressed air engine, partly in section, so as to expose certain working parts.

Figure 1:
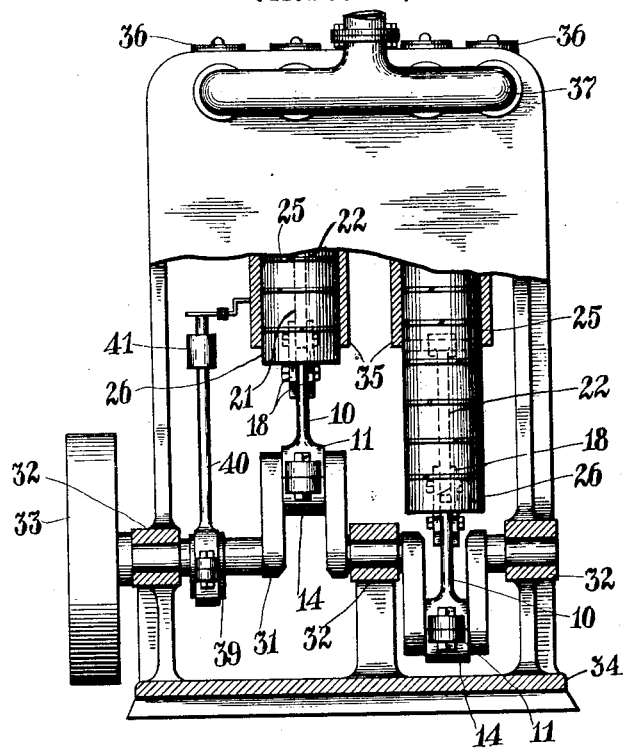
Figure 2:
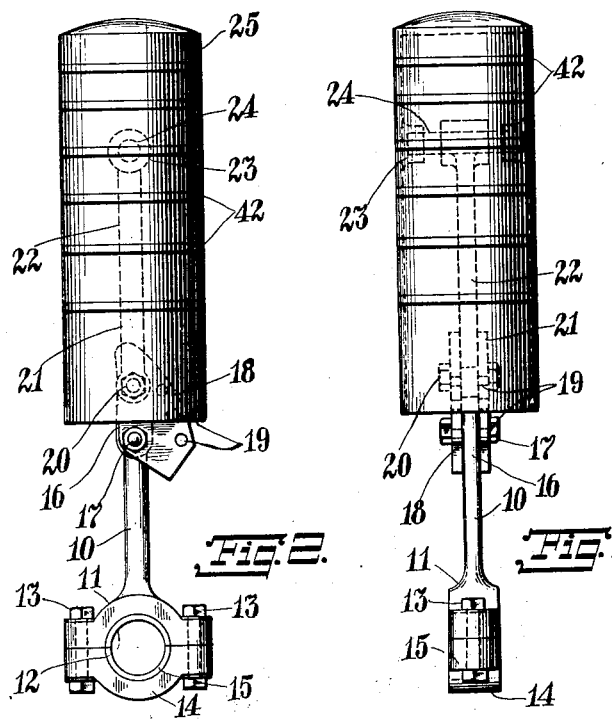
Fig. 2 is an enlarged front elevational view of the connecting rod and piston as embodied in my improved compressed air engine.
Figure 3:
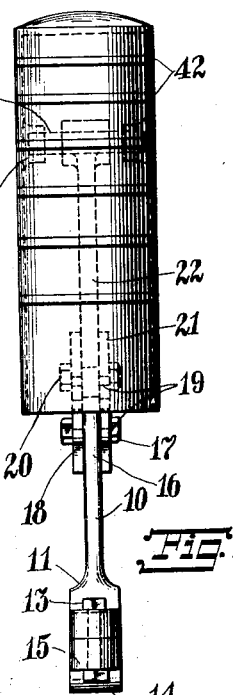
Fig. 3 is a side elevational view thereof.

As here embodied my improved connecting rod comprises a connecting rod proper 10, having an enlarged lower extremity 11, adapted to support the upper half 12 of a bearing, and provided with bolts 13, or any similar suitable means of removably holding a cap 14 thereto, which is adapted to support the lower half 15 of the said bearing.

The upper extremity 16 of the connecting rod proper 10 is provided with an aperture to accommodate the bolt 17, or any similar suitable means of attaching a pair of adjusting pieces 18 thereto, which are provided with a plurality of apertures 19 unequally located from the bolt 17, to accommodate the bolt 20, or any similar suitable means of attaching the said pair of adjusting pieces 18, to the lower extremity 21, of the upper connecting rod 22. The upper connecting rod 22 is pivotally attached, at its upper extremity, as at 23, to the piston pin 24, which is rigidly attached to the piston proper 25, provided with piston rings 42.

The above described construction is such as will permit my improved connecting rod to be lengthened or shortened, as may be desired, by the use of the apertures 19.

Referring in particular to Fig. 1 of the accompanying drawings, in which I have illustrated a compressed air engine having a crank-shaft 31, rotatively mounted in the bearings 32, and having rigidly attached thereto a fly-wheel 33, and provided with a suitable base 34 or support and having cylinders 35, intake manifold 36 and exhaust valves 37. The crank-shaft 32 has also attached thereto an eccentric 39, adapted to drive the eccentric rod 40, as a means of opening and closing intake and exhaust valves. The latter described construction is that of an ordinary internal combustion engine such as generally used. It will be understood that my improved connecting rod, as hereinbefore described, is adapted to transmit the power from the piston proper 25 to the crank-shaft 31.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

A connecting rod for compressed air engines comprising an upper rod section journaled on a piston pin having an aperture in the lower extremity thereof, a lower piston rod section journaled at its lower extremity on the crank shaft of an engine, adjustable plates having a plurality of spaced apertures disposed between the lower end of said upper rod section and the upper end of said lower rod section, and bolts disposed through the apertures in said plates and the apertures in said rod sections for securing said rod sections together, said bolts being adapted to be selectively inserted through other apertures in said plates for varying the combined length of said rod sections.

In testimony whereof I have affixed my signature.

JOHN GÚBA.